March 22, 1966   B. R. WALTER   3,241,679
FILTER WITH ASSEMBLY MEANS FOR VARIABLE LENGTH ELEMENTS
Filed Oct. 15, 1962
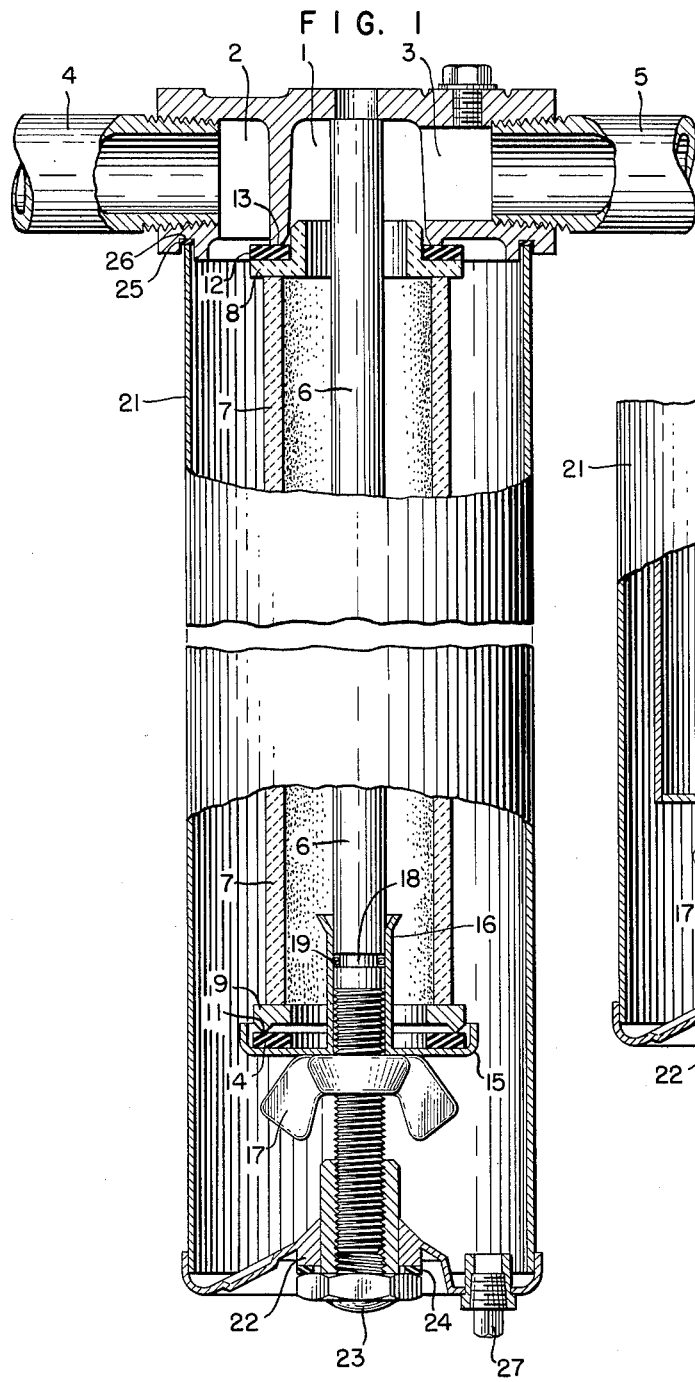
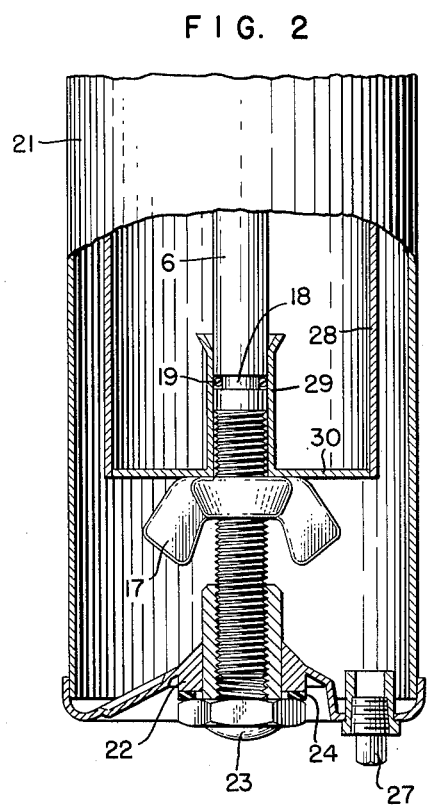
INVENTOR.
BERNARD R. WALTER
ATTORNEY.

3,241,679
FILTER WITH ASSEMBLY MEANS FOR
VARIABLE LENGTH ELEMENTS
Bernard R. Walter, Roslyn, Pa., assignor to Selas Corporation of America, Dresher, Pa., a corporation of Pennsylvania
Filed Oct. 15, 1962, Ser. No. 230,544
2 Claims. (Cl. 210—444)

The present invention relates to filters, and more particularly to a construction of a filter unit using a rigid filter element.

For many applications of fine filtration, rigid filter elements of porous ceramic or porous metal are used. Since it is practically impossible to keep the dimensions of such elements within exact tolerances, there has always been the possibility of leakage around the filtering element in the completely assembled filter unit of constructions previously used. This is particularly true where the filtration takes place at an elevated pressure or there is a fairly large pressure drop across the filter element.

It is an object of the invention to provide a filter unit which includes a means for fastening a rigid filtering element in place in such a manner that no leakage around the element can take place.

It is a further object of the invention to provide a filter unit in which the various parts are inexpensive to manufacture, and are easy to assemble.

An additional and important object of the invention is to provide a casing into which filter elements with relatively wide variations in dimensions can be assembled without leakage around the elements.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

FIG. 1 is a section through one form of the invention showing the entire assembly, and FIG. 2 is a section of a portion of a filter unit using a different type of filter element.

The entire filter unit is supported by a casting 1 which is provided with an inlet passage 2 and an outlet passage 3. This support is placed in a pipe line through which the material to be filtered flows with the supply or inlet pipe, indicated at 4, being threaded into the entrance of passage 2 and the outlet pipe 5 being threaded into the outlet of passage 3. The filter element and the casing surrounding that element are mounted concentrically around a central rod or shaft 6 whose lower end is threaded and whose upper end is rigidly fastened to the casting 1 in any suitable manner.

The filter element used in this embodiment of the invention is shown as being made of porous ceramic which is a rigid material. The element consists of a porous ceramic cylinder 7 to the upper end of which is cemented a nonporous ceramic annulus 8, and to the lower end of which is cemented a second nonporous ceramic annulus 9 having a sharp edge 11 formed on its lower surface. The filter element is moved upwardly over the shaft 6 so that its upper end 8 is aligned with a seat 13 formed on the support. A suitable gasket 12 is placed between the seat and a flange formed on the upper surface of member 8. The filter element is held in place by means of a gasket 14 which engages the edge 11 and which is supported by a part consisting of a disc 15 extending radially from a sleeve 16 that closely surrounds shaft 6. The elements are moved together in order to compress the gaskets 12 and 14 by means of a wing nut 17 that is threaded on the lower end of shaft 6. In order to prevent any possible leakage of the material being filtered between sleeve 16 and shaft 6, the shaft is provided with a groove 18 that receives a resilient O-ring 19 which engages the inner surface of the groove and the inner surface of the sleeve.

The casing of the unit which surrounds the filter element can be formed of one piece or can be assembled from several pieces and includes a metal cylinder 21 and a base which is shown as being brazed thereto. This base has a thicker portion 22 through which the rod 6 extends. Casing 21 is held in position by means of a hollow nut 23 that is threaded on to the lower end of the shaft 6, with a gasket 24 being placed between the head of the nut and portion 22. As the nut is tightened, the upper end of the casing is forced against a gasket 25 that is placed in a groove 26 in the lower face of support 1. The casing is also provided with a drain plug 27.

In assembling the apparatus, the various gaskets are placed on their respective parts, such as gasket 12 being placed on the flange of portion 8 and gasket 14 being placed on disc 15. The filter element is then moved into the position shown, and sleeve 16 is moved up along the shaft. The upper flaring portion of sleeve 16 slides easily past the O-ring, and the wing nut 17 is turned to force the various parts together and form a seal between the ends of the filter element and its supporting parts. It will be seen that the sleeve 16 cooperating with O-ring 19 will provide a sliding seal that will positively prevent the flow of any of the liquid being filtered past the lower end of the filter element around rod 6. Because of the arrangement of the sleeve 16 and the O-ring, it is possible to produce a tight seal regardless of any slight differences in the length of the filter element 7. In an element of this type, it is practically impossible to keep very small tolerances in the length that would prevent possible leakage around the ends of a filter element, unless some sliding seal of this type is used. With this arrangement, however, any reasonable manufacturing tolerance that can be maintained in the manufacture of a filter element is perfectly permissible, since this tolerance can be taken up by movement of sleeve 16 with respect to the O-ring.

After the filter element has been placed on the shaft 6, casing 21 is moved into position and nut 23 threaded on to its lower end in order to force this casing against the gaskets 24 and 25 respectively. Here again close tolerances in the length of the casing are not required, since sufficient distance is provided between the lower end of shart 6 and the cap of nut 23 to take up any reasonable variation in the dimension of the casing.

The liquid to be filtered flows from pipe 4 into the inlet passage 2, down to the space between the casing 21 and the filter element. The liquid then flows through the filter element and back up through the center opening within seat 13 and through outlet passage 3 to outlet pipe 5. This outside-in filtering permits easy cleaning of the surface of the filter element 7 merely by removing the single nut 23 and casing 21. When it becomes necessary to replace the filter element with a new one, only two nuts need to be removed from shaft 6. The arrangement assures that elements can be interchanged easily and quickly without the necessity for worrying about whether or not there will be a good seal between the supporting rod and the filter element. The arrangement, as explained above, insures that this seal will always be good regardless of any reasonable variation in length of the filter element. Reasonable variations in the diameter of the filter element are taken care of by the wide gaskets 14 and 12 which can be used with the present arrangement.

In FIG. 2 there is shown an assembly similar to that previously described, except that a rigid, porous metal filter element 28 is disclosed. With an element of this type, a fixture, including a disc 30 and sleeve 29, can be separate as shown in FIG. 1, or can be brazed to the end of the filter element to form a one piece assembly, as shown in the drawing. This does away with the necessity for the additional gasket that is shown in FIG. 1. In this case also, there is provided a sliding seal between sleeve 29 and O-ring 19 that permits any reasonable variation in length of the filter element that would be encountered in normal manufacturing processes, without any question of leakage occurring between the element and its supporting shaft.

From the above description, it will be seen that I have provided a filter unit comprising a relatively few number of parts which are easy and inexpensive to make. This unit can be assembled and the filter element changed merely by the use of two nuts threaded on a single shaft and without disconnecting the unit from the liquid line. When the parts are in position, there is automatically maintained a tight seal so that there is no possibility of leakage around the filter element, even though different elements may vary slightly in length.

While in accordance with the provisions of the statutes, I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. In a filter unit, a support having an inlet passage and a substantially circular outlet passage, said support being provided around the entrance end of said outlet passage with a circular seat, a rod extending from said support through and perpendicular to said seat, a cylindrical, rigid filter element surrounding said rod, a part having a disc portion and a sleeve portion extending axially from said disc, said sleeve being closely received on said rod with said sleeve extending toward said support, a gasket between one end of said filter element and said seat and between the other end of said filter element and said disc, means threaded on said rod to engage and force said disc toward said seat and thereby seal said filter element between the two, a sliding seal carried by said rod between said sleeve and said rod, said sliding seal comprising a groove located in said rod between the ends of said sleeve and an O-ring of resilient material received in said groove, a casing surrounding and spaced from said filter element, and means to hold said casing against said support, said inlet passage terminating between said casing and said filter element.

2. A filter unit comprising in combination a support having an inlet passage and a substantially circular outlet passage, a rigid, cylindrical filter element to be interposed between said passages, means to hold said element in place including an annular seat formed around one end of said outlet passage, a rod attached to said support and extending axially through said seat, said element surrounding said rod and having one end aligned with said seat, a sleeve closely surrounding said rod, said sleeve having a disc portion projecting radially therefrom on the end thereof away from said support with said disc portion being adapted to engage the other end of said filter element, means threaded on said rod to engage said disc to force it and said element toward said seat, means to seal the joints between said seat and element and between said element and said disc, and a sliding seal carried by said rod between said sleeve and rod whereby filter elements of various lengths can be used, said sliding seal comprising a groove located in said rod between the ends of said sleeve and an O-ring of resilient material received in said groove, a casing surrounding and spaced from said filter element and a means to hold said casing against said support, said inlet passage terminating between said casing and said filter element.

References Cited by the Examiner

UNITED STATES PATENTS

| | | | |
|---|---|---|---|
| 680,902 | 8/1901 | Weaver | 210—442 |
| 1,901,484 | 3/1933 | Winslow et al. | 210—442 X |
| 2,076,935 | 4/1937 | Burckhalter | 210—442 X |
| 2,280,033 | 4/1942 | Aldham | 210—442 X |
| 2,362,530 | 11/1944 | Bennett | 210—442 X |
| 2,389,431 | 11/1945 | Hallinan | 210—442 X |
| 2,478,109 | 8/1949 | Kamrath | 210—442 X |

FOREIGN PATENTS 922,579  2/1947  France.

REUBEN FRIEDMAN, *Primary Examiner.*

HERBERT L. MARTIN, *Examiner.*